US008312043B2

(12) United States Patent
van Riel et al.

(10) Patent No.: US 8,312,043 B2
(45) Date of Patent: Nov. 13, 2012

(54) ISOLATING AN EXECUTION CONTAINER IN A SYSTEM WITH MANDATORY ACCESS CONTROL (MAC)

(75) Inventors: Henri H. van Riel, Nashua, NH (US); Daniel J. Walsh, Marlborough, MA (US); Warren I. Togami, Jr., Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 650 days.

(21) Appl. No.: 12/324,643

(22) Filed: Nov. 26, 2008

(65) Prior Publication Data

US 2010/0131559 A1 May 27, 2010

(51) Int. Cl.
*G06F 17/30* (2006.01)

(52) U.S. Cl. ........................................ 707/783

(58) Field of Classification Search .................. 707/783
See application file for complete search history.

(56) References Cited

U.S. PATENT DOCUMENTS 5,701,458 A * 12/1997 Bsaibes et al. .................. 1/1
6,189,019 B1 * 2/2001 Blumer et al. ............ 715/205
7,069,437 B2 * 6/2006 Williams .................. 713/166
7,904,474 B2 * 3/2011 Rowley .................. 707/781
2002/0186260 A1 * 12/2002 Young .................. 345/853
2003/0172109 A1 9/2003 Dalton et al.
2004/0215950 A1 * 10/2004 Lindeman .................. 713/1
2005/0149726 A1 7/2005 Joshi et al.
2005/0289150 A1 * 12/2005 Kudo .................. 707/10
2006/0085838 A1 4/2006 Samuelsson et al.
2008/0016339 A1 1/2008 Shukla
2008/0244074 A1 10/2008 Baccas et al.
2009/0125711 A1 * 5/2009 Schneider .................. 713/100
2010/0131559 A1 * 5/2010 van Riel et al. ............ 707/783

* cited by examiner

*Primary Examiner* — Robert Beausoliel, Jr.
*Assistant Examiner* — Noosha Arjomandi
(74) *Attorney, Agent, or Firm* — Lowenstein Sandler PC

(57) ABSTRACT

Preventing a process from traversing back a directory tree through its parent directories is described. In a system with a program executing in a path container, an access permission rule applicable to the instance of the program prevents the program from traversing the tree structure back through its parent directories towards an absolute root directory. The access permission rule may be a rule in an instance of a security policy applicable to the particular path container from which the process is executing.

21 Claims, 5 Drawing Sheets

ISOLATING AN EXECUTION CONTAINER IN A SYSTEM WITH MANDATORY ACCESS CONTROL (MAC)

RELATED APPLICATIONS

This Application is related to co-pending U.S. patent application Ser. No. 12/324,677, entitled, "Merging Mandatory Access Control (MAC) Policies in a System with Multiple Execution Containers," having common inventorship, and filed concurrently herewith, and to co-pending U.S. patent application Ser. No. 12/324,679, entitled, "Reliably Terminating Processes in a System with Confined Execution Environments," having common inventorship, and filed concurrently herewith.

FIELD

The invention is generally related to mandatory access controls, and more particularly to isolating an execution container in a system with mandatory access control.

COPYRIGHT NOTICE/PERMISSION

At least a portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, Red Hat, Inc., All Rights Reserved.

BACKGROUND

Some computer system environments allow execution of program instances in separate sub-execution environments. A sub-execution environment operates under a parent environment, whether it is the absolute root of the directory tree, or another branch in the directory tree. In an environment where sub-execution environments are permitted (e.g., chroot in a UNIX/LINUX environment), there may be a way for a program to "escape" from the sub-execution environment. Basically, even in environments where sub-execution environments exist as confined execution environments, it is generally possible for a "confined" process to view outside the sub-execution environment and execute operations outside the confined environment. Traditionally, a program in a sub-execution environment can traverse the directory tree to its parent, or above. Thus, a program need simply access a point in the directory outside the confined environment, and it may obtain access to data and/or services that it may not be intended to access. In many cases, the access to a directory logically above its execution container can be a security risk.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
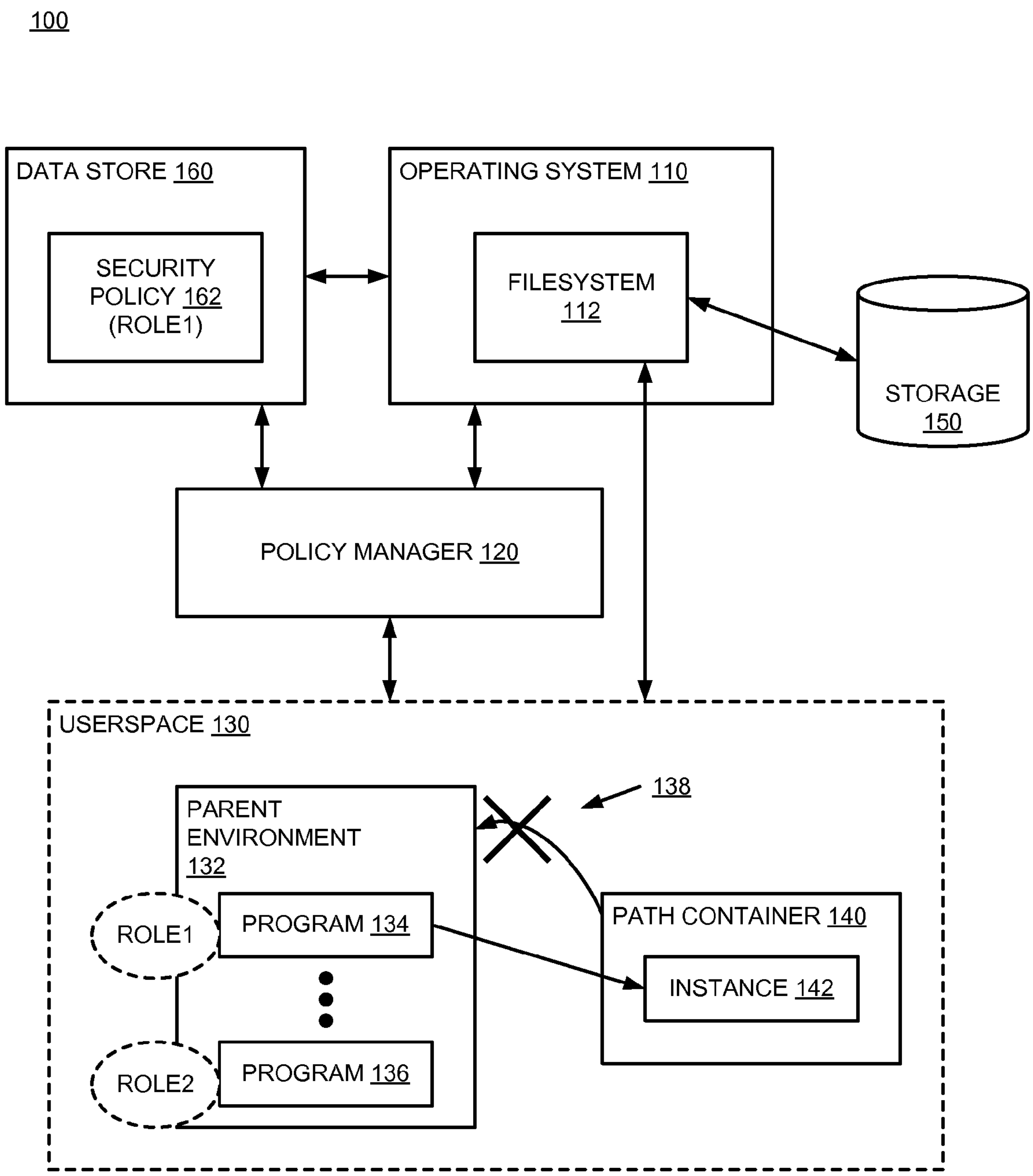
FIG. 1 is a block diagram of an embodiment of a system having a path container and a policy manager to manage a restriction policy applicable to the path container.

In one embodiment, mechanisms for preventing a process from traversing back through a directory tree to parent directories is described. In a system with a program executing in a path container, an access permission rule applicable to the instance of the program prevents the program from traversing the a tree structure representing the directory structure back through its parent directories towards an absolute root directory. The access permission rule may be a rule in an instance of a security policy applicable to the particular path container from which the process is executing. The rule prevents traversing of the tree structure directory beyond a specified directory. The directory may be specified absolutely (defining a directory path beyond which the program is unable to traverse), or relatively (e.g., cannot traverse more than one parent directory toward absolute root.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

As mentioned above a general problem with the use of path containers or confined execution environments, with chroot being one example, is that a root process within the path container can escape from the chroot by performing the following operations or equivalents:

cwd(../../../../..);

chroot(.);

The root process within the chroot is able to traverse the directory tree of the system, and thus obtain access outside the chroot. The cwd command (current working directory), allows the process to obtain access to a parent directory, and then change root back to that directory. One possible way to deal with this vulnerability is to simply disable chroot privileges inside a chroot. However, disabling chroot is not a desired solution, seeing there are many uses for processes to chroot "further down" and provide other path containers for certain processes or operations. Instead, MAC rules can be employed (e.g., those available in SELinux) to isolate a chroot environment from the system's main environment by having a directory that cannot be traversed by any task from inside the chroot environment. The directory may also be non-traversable by other security contexts from outside the chroot environment.

Many operating systems implement mandatory access control (MAC) systems that provide rules for access to files, data, and services. Examples of operating systems that employ MAC or similar techniques are SELinux, SECURE SOLARIS (of Sun Microsystems, Inc., of Santa Clara, Calif.), and WINDOWS VISTA (of Microsoft Corporation of Redmond, Wash.). Note that all copyrights used here and elsewhere herein are used solely for purposes of identification of a product. All marks are the property of their respective owners.

In a MAC system, programs are executed under a security role, or other form of access permission identifier. For each role or group of roles, there are one or more rules that define what programs having the role are allowed to do. The rules can be referred to as permissions, access permissions, security policies, or some other label. However, systems traditionally are designed to apply the same rules to all programs having the same role. The general applicability of rules to programs of the same role is true even when the programs are executed in separate restricted execution environments. Thus, even in systems employing MAC restrictions, a program operating in a confined or sub-execution environment can escape the environment because its permissions are the same as its parent directory.

As used herein, an execution environment can refer to a principal or main execution environment, which is the environment provided by the operating system under which all programs on the system execute. Note that differences in terminology may be used. While it is said that the programs execute "under" an operating system, the terminology is essentially interchangeable with other terminology. When focusing on the concepts of control/management in the system, it is typically said that programs run "under" the operating system. When referring to the operating system as an environment that provides services and enables execution of programs, it may be said that programs run "on top of" the operating system, although a program could be said to run or execute under an environment. Either term may be used herein.

By applying MAC controls for specific execution environments, rules can be established that prevent processes within a confined execution environment from traversing higher than a certain point up the directory tree. There may be at least two general implementations, each of which may be have variations. In one embodiment, system-level MAC rules are added to the system-level security policy to mark a directory in the chroot path as non-traversable by processes inside the chroot. For example, the chroot path can be /var/secure/chroot, with /var/secure having a security context chroot_t that only the unconfined_t role can traverse. Processes with other security contexts cannot traverse directories higher than the chroot. Additionally, many other processes outside the chroot will be prevented from traversing the path. Thus, for example, httpd_t or named_t processes from either inside or outside the chroot cannot traverse the directory tree structure past the marked directory, either to escape a chroot (processes inside the chroot) or to get data from inside the chroot (processes outside the chroot). To confine other processes inside the chroot, in one embodiment, the chroot can get a special variant of unconfined_t that can do everything normal unconfined_t can do, except traverse directories of context chroot_t. Thus, a chroot can have an unconfined_t that is actually confined to everything under the directory tree under the marked directory.

In another embodiment, rather than implementing a system-level security rule change, the directory traversal restrictions can be applied as described above with respect to the copies of the security policy that are applied locally to specific path containers or chroots. In such an implementation, specific restrictions or constraints can be implemented in the security policy applied locally to each individual path container that prevent processes within the path container from traversing outside the path container. Thus, preventing path traversal can be a simple extension of a multiple security policy scheme, or may be implemented at the system level, independent of such a scheme.

In one embodiment, rather than using the kernel filesystem (e.g., selinuxfs), the filesystem in each chroot is a userspace mount that segregates the security contexts of the chroot from those of the main installation. The userspace mount may be a FUSE (filesystem in userspace) mount. FUSE allows implementation of a fully functional filesystem in a userspace program, by creating a module in the kernel that translates or maps the filesystem calls in the userspace to the actual interfaces in the kernel. In one embodiment, each userspace application of FUSE (such as in each path container or chroot) includes a userspace daemon or module that segregates the security contexts and merges all security contexts into a single security policy that gets loaded into the kernel. Thus, the virtualization of the filesystem can provide a mechanisms to cause each chroot to see itself as root in its execution. The mount acts as a filter or map to the actual filesystem as seen by the OS kernel.

As used herein, a path container refers to a confined environment or confined execution environment, where a process or program operating inside the path container is restricted in what operations can be performed, and what data and services can be accessed. A path container can be considered a type of container, where the instance inside the container is a program, and the container limits the scope of operation of the instance to a particular sub-path of the OS's execution environment (e.g., limited to within a certain sub-directory). As used herein a program may refer to a software application or a software component that executes in support of a software application. A "process" as used herein may refer to a program instance, or may refer to a component of an instance of a program (and thus there may be multiple processes that are part of a single program instance). The processes are identifiable, having an identifier or a label. Such processes may also be referred to as labeled processes. A path container can execute one or more program instances. There may be instances of various different programs. chroot refers to an operation within a Unix/Linux environment that changes an apparent root as seen by program instances. Thus, the directory of the path container may be considered "root" for all processes or programs within the path container, but it may be several levels removed from system root, or absolute root. A directory logically above the path container may be referred to as a parent. As used herein, chroot is used as an example of a path container, but will be understood as only an example, and the concept of a path container includes chroot, as well as other mechanisms that can create a path container as described herein.

In one embodiment, a security policy has multiple types of security contexts, for example, security contexts and file contexts. File contexts indicate what security rules apply to a file. A security context indicates for a process what ways it can manipulate or operate on processes of the same and/or other security contexts, files of various security contexts, and other system resources. These security contexts may be associated with roles. A program with a particular role has the permission of a corresponding security context.

For example, consider that a process running as unconfined_t can execute an executable file with the security context named_exec_t, resulting in a new process running as bind_t security context. Because file contexts and process contexts are separate from each other, with interactions defined by the security policy, the same set of file contexts in various chroots can be used with different (instances of) security policies and different process contexts. In its simplest form, the security contexts inside a chroot can simply be modified by the name or identifier (ID) of the chroot, which forms a new security policy. The modification could be, for example, prepending (adding a prefix) of the chroot ID, or appending (suffixing) the security contexts with the chroot ID, or otherwise adding the identifier. Prefix and suffix modifications are simple in systems where the security labels exist as strings in a configuration file. For example, consider the following two file security contexts and a transition rule between two process security contexts:

/bin/bash bin_t

/bin/ping ping_exec_t

Often /bin/bash is run in the security context unconfined_t, which is allowed to execute files of the security context ping_exec_t, transitioning the process from unconfined_t context into ping_t context. Consider a chroot called 'chroot1', with the same file contexts as set forth above. Inside the chroot, the shell may be started up in the security context chroot1_unconfined_t, with the execute transitioning rule that if a chroot1_unconfined_t process executes a ping_exec_t file, the process context changes to chroot1_ping_t. Thus, processes from the chroots are isolated from each other, and from the root filesystem. Other implementations of MAC use a combination of tokens, either direct or inherited, that together constitute a security context. In implementations based on a MAC using a combination of tokens, either direct or inherited, tokens can modify the security context to differentiate a chroot ID for an instance of a policy. For example, in a hierarchical MAC system, a security policy or context may inherit from another policy or context, including a token identifying that it is part of a path container to be isolated.

Furthermore, generating a system-wide security policy that covers all of the chroots can be performed automatically, for example by: 1) generating a security context prefix (or other naming convention based on the chroot ID), which can be applied upon creating a chroot; 2) prefixing or, more generically, modifying all process security contexts for a particular chroot with the naming convention modification when processing the security policy for the particular chroot; and, 3) merging the security contexts from all chroots into a single large security policy, which can be loaded into the OS kernel. Note that the merging of the security contexts may be a trivial task when all of the process security contexts have been renamed.

Thus, in one embodiment, role transitioning can be defined in the security policy. If role transitioning is defined in the security policy, the security labels on files do not need to be changed inside the chroot. The process security contexts from the chroots do not intersect with each other in the system (or, as referred to below, in the tree structure environment of the system), because each chroot can have its own security policy. The separation of security policies among the different chroots makes it possible for software inside a chroot to change its security policy and reload the changed security policy applicable to the chroot. When the new security policy is reloaded, the security policy may be intercepted by a system component (for example, a FUSE filesystem daemon) that integrates the chroot security policy into the system-wide security policy as described above.

FIG. 1 is a block diagram of an embodiment of a system having a path container and a policy manager to manage a restriction policy applicable to the path container. System 100 represents a computing system environment according to any embodiment described herein. System 100 includes operating system (OS) 110, and userspace 130. OS 110 can be any type of operating system, such as those mentioned above, that implements access controls on programs and/or otherwise enables a path container in userspace 130. User space 130 is an abstraction of an "area" within system 100 where user programs execute. It will be understood that the separation between OS 110 and the kernel or system-level operating environment and userspace 130 refers to a separation of privileges and permissions among the various processes that may run in each. Additionally, userspace 130 is where user-level programs are executed that are executed by or in response to user activity, whereas system-level processes are typically executed incident with the operation of the system, and may not require user input or user interaction in the same way as user-level processes.

System 100 includes data store 160, which represents a device that can store information. The device may include static (non-volatile) and/or dynamic (volatile) memory, and may include a database. Data store 160 includes security policy 162, which is shown as corresponding to a particular program role (Role I). As used herein, a role refers to a set of permissions or privileges associated with a program, and may be referred to as a security context. A role can also refer to an operation of the program and/or a use of resources by the program. A role can apply to a specific program, or with an entire execution environment (e.g., a path container). Security policy 162 is an example of any policy that affects the interaction and/or the operation of processes on system 100. Thus, the label “security” should not be read in a limiting sense, and the policy may be any type of policy. Specifically as shown, security policy 162 applies to a type of program, or a program executing with a particular role. OS 110 has access to data store 160 and information stored in it.

OS 110 includes filesystem 112, which represents an organization mechanism for files and data stored in storage 150. Storage 150 is a non-volatile storage, where values and information are retained even when power in system 100 is lost or interrupted, as contrasted to volatile storage such as main memory, which typically loses its value if power is interrupted. Filesystem 112 provides an interface between programs and processes executing in system 100 to access (read and/or write) data to storage 150. Filesystem 112 can be considered to provide a “view” of data to a program. Typically, the operation of filesystem 112 is understood by those skilled in the art as a program requesting an access service of filesystem 112, which then performs the service to provide the requested access.

System 100 also includes policy manager 120, which represents one or more components or modules within system 100 that manages security policies for userspace path containers, such as path container 140. In one embodiment, policy manager 120 is implemented as, or includes, a daemon. A daemon is understood as a background process that performs a certain tasks or group of related tasks, and may also be referred to as a “service” in some contexts. In one embodiment, policy manager 120 manages security policies that are customized for particular path containers executing in userspace 130. In one embodiment, policy manager 120 executes in userspace 130, but could also operate in whole or in part with modules in kernel-space. Management of the security policies specific to certain path containers includes segregating security contexts of the path container(s) from the main system (the root environment), and merging individual or individualized security policies into a security policy loaded into a kernel of OS 110. When referring to a security policy being loaded into a kernel of the OS, it will be understood that the security policy is stored in, for example, main memory, and the address of the security policy is passed to the kernel. Thus, the kernel may know where the security policy is located, and may perform operations with reference to the security policy and its contents.

Additionally, it will be understood that reference herein to a security policy being loaded into the kernel is only an example, and should not be interpreted as limiting. In one embodiment, the policy can be loaded, stored, and enforced outside the kernel, for example, in the userspace. While it may be common in many operating systems for a kernel to implement the policies, not all services are necessarily all run in the kernel-space. For example, certain operating systems exist (such as so-called “micro kernel OS” or “hybrid OS”) where some or many services in the system are executed in userspace. While the example of implementing policies is described herein as being performed in the kernel-space, it will be understood that the mechanisms described herein are generally applicable, and could be similarly performed in implementations that provide services in the userspace.

Userspace 130 includes parent environment 132, which represents parent directory of path container 140. Parent environment 132 may be an absolute root directory, which is a main execution environment in userspace 130. Parent environment 132 includes one or more programs, illustrated by programs 134-136. The programs may have various roles, and multiple programs may have the same role. Program 134 is shown as having Role1, and program 136 as having Role2.

Userspace 130 also includes path container 140, which is an execution environment in system 100 that is subject to restrictions. A common scenario is for path container 140 to execute an instance of a program that may have other instances running in system 100. For example, instance 142 of path container 140 is shown as being an instance of program 134 of root environment 132. Note that instance 142 will also have Role1, given that it is an instance of program 134. Path container 140 is restricted in access and/or permissions, as shown at 138—processes within path container 140 may be unable to access anything in parent environment 132 outside the context of path container 140.

In one embodiment, application of security rules to restrict the ability of processes within path container 140 from traversing beyond a particular directory may be implemented on the path container itself. For example, in a permissive scheme, permitting access to particular paths may prevent access to any other path. Alternatively, rules may be applied above a certain level of process, and access permissions may be permitted at that level, but not at the level below. Thus, normal access may be permitted, but not traversing above a certain directory, which would be restricted to the higher directory.

Note that there is depicted a data store, which represents a memory or storage device in which various items may be stored. In the description of the remainder of the figures, security policies may be depicted as being “within” a kernel, or a policy manager. It will be understood that such depictions are representative, and values representing the security policies are stored somewhere in physical memory, and are “loaded” or known to the kernel or the policy manager. Thus, for simplicity in depicting and describing the concepts herein, the remainder of the description does not explicitly show the data store or the physical location of the components stored in storage/memory devices.

Figure 2:
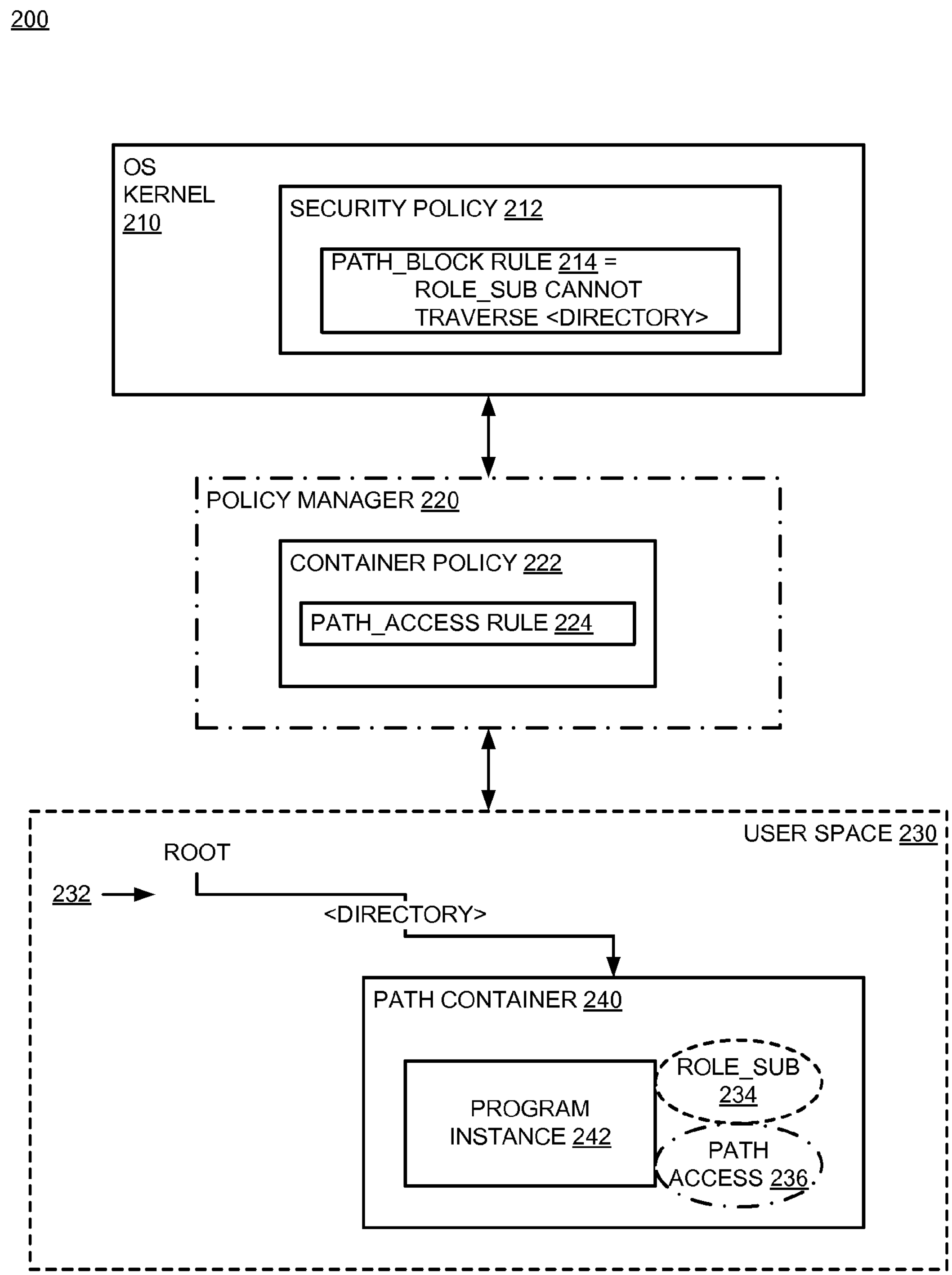
FIG. 2 is a block diagram of an embodiment of a system that restricts processes within a path container from traversing a path back to a parent directory.

FIG. 2 is a block diagram of an embodiment of a system that restricts processes within a path container from traversing a path back to a parent directory. System 200 represents an example of a computing system environment according to any embodiment described herein. System 200 includes OS kernel 210, which represents a kernel in the operating system of system 200 that executes operations related to system security and/or interaction of processes within system 200. OS kernel 210 includes security policy 212, which represents a system-level security policy, having one or more rules.

Security policy 212 can be implemented as a permission-based mechanism, or an exception-based mechanism. A permission-based rule is a rule that indicates what is allowed. Implicitly in a permission-based system, whatever is not explicitly allowed may be disallowed. An exception-based system may be the converse, where operations are generally allowed, unless specified otherwise in the rules. MAC systems implemented in Linux platforms are generally permission-based, permitting only what is specifically allowed in the rules, and denying all other operations. Each rule represents a policy for a specific security role within system 200, applicable to processes executing within system 200 that have roles corresponding to the security policies.

OS kernel 210 include a policy enforcement mechanism (not shown), which implements or enforces the rules of the security policies. Thus, when an operation is requested by a process, its permissions can be tested against its corresponding security policy, and the operation permitted or denied based on the rules.

In one embodiment, security policy 212 includes rule 214, which is referred to in the figure as a path_block rule. The rule is a "path_block" rule because it specifies a restriction on traversing a directory path back up the tree to parent directories. In one embodiment, the confinement of not being able to traverse the directory tree structure is with reference to a specific directory. The directory could be specified as the chroot directory of the path container, or a directory of a parent a certain number of levels up the directory tree. Alternatively, the directory could be specified by an absolute path name. Thus, path_block rule 214 may specify a rule to the effect that a particular role (role_sub) cannot traverse <specified directory>. A version of the rule that utilizes a "permitted access" type application of rules may specify that role_sub can traverse any directory within <directory> and its dependents, and thus implicitly exclude any other directory.

Userspace 230 includes tree-based directory or execution environment 232. The specified <directory> is shown as a parent of path container 240 of userspace 230. The specified <directory> is not necessarily a single level up from path container 230, nor is the specified <directory> necessarily a single level down from root.

Userspace 230 is an abstraction to illustrate various execution environments in system 200. In one embodiment, userspace 230 includes a tree-based execution environment 232, which has a root environment that may have zero or more sub-environments. The root may be an absolute root, or may be a root within a particular execution environment under which other execution environments may run. In general, processes that are closer to root in tree-based execution environment 232 have higher privileges than those farther down the tree. Processes farther up the tree, closer to root, are generally able to see processes further down the tree. Each path container allows the restricted execution of its processes, which generally cannot access files, processes, or services outside the security context of their respective path containers.

Path container 240 includes program instance 242, which has associated role_sub 234, and a variant path access 236. With rule 214, program instance 242 is unable to traverse environment 232 beyond <directory>. Role_sub 234 indicates the role that program instance 242 has. Role_sub 234 is similar to any other role described herein, and it is understood that role_sub 234 is a subordinate or child to the directory specified in <directory>.

To implement the non-traversable path mechanisms described herein, there is no requirement for the use of a policy manager or specific path container policies. Additionally, non-traversable rules mechanisms could be applied to roles rather than specific path containers. However, in an implementation where a policy manager is used in system 200, policy manager 220 may include rule 214 in container policy 222 corresponding to path container 240. Thus, the rule can exist at the system kernel and/or at the path container policy. In one embodiment, container policy 222 includes path_access rule 224, which indicates a variation on a root path that is applicable within path container 240. Thus, for example, there may be processes to be run in path container 240 that require root access, and/or access to a directory higher up tree environment 232 than <directory>. In such a case, an alternate or variant path may be provided within path container 240, which would enable the processes to run as though they had access to the needed directory. However, the path used by the processes within the path container would not provide system-level access. Thus, path_access rule 224 can provide path access 236 to program instance 242 to enable it to execute.

Figure 3:
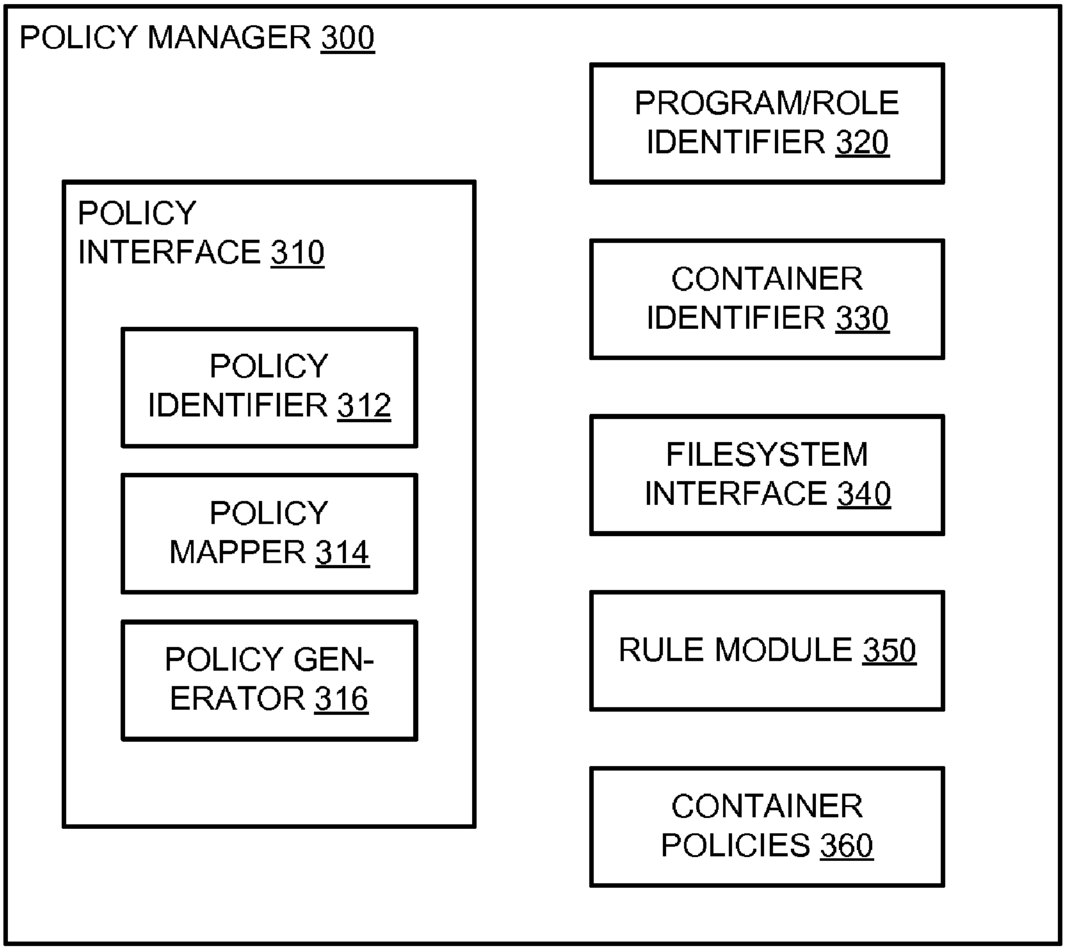
FIG. 3 is a block diagram of an embodiment of a policy manager that manages security policies for path containers.

FIG. 3 is a block diagram of an embodiment of a policy manager that manages security policies for path containers. Policy manager 300 represents a policy manager according to any embodiment described herein. In general, policy manager 300 manages individual security policies as applied to particular path containers within a computing system (a host system). In one embodiment, policy manager 300 creates policies individual to target path containers. Policy manager 300 may include kernel-level interfaces and userspace interfaces. The components of policy manager 300 are intended as examples, and are not to be understood as limiting. A policy manager could be implemented with more, fewer, and/or different components than those shown. The components may exist as standard commands or operations within an execution environment, or they could be customized modules, or a combination of both.

Policy manager 300 includes policy interface 310 that interfaces the policy manager with the security policies in the host system. The policies that are interfaced include the general or system-level policies from which policies are created for individual path containers, as well as the policies for the individual path containers. Policy interface 310 includes policy interface 312, which enables policy manager 300 to identify or determine what policy applies to a program. A program has an associated policy based on the type of the program, the security context of the program, or other attributed associated with the program, depending on the implementation. Policy interface 312 can read or obtain the information that indicates the policy, and match it to the security policies at the system level. A security policy specific to a path container is generated from the system-level security policies. The policy specific to a path container can then be applied to each program and process running in the path container.

Policy interface 310 includes policy mapper 314, which enables policy manager 300 to associate policies specific to particular path containers to system-level security policies. Thus, policies are applied consistently throughout the system as required by typical MAC-based systems, but allows logical separation of the security policies. The logical separation of the policies allows the path containers to be separate from each other, even if the same system-level security policy applies to each path container.

Policy interface 310 includes policy generator 316, which enables policy manager 300 to create and modify copies of system-level security policies. Thus, policy manager 300 can generate a policy and associate it with a path container. Alternatively, the system kernel could generate the policies. Policy manager 300 would generally associate the copies of the policies with specific path containers.

Policy manager also includes program/role identifier 320, which enables policy manager 300 to identify one or more programs or processes within a particular path container and identify a role associated with the identified path container. The role indicates what policy is applicable to the path container, and may be used by policy interface 310 to identify the applicable policy.

Policy manager 300 also includes container identifier 330, which enables policy manager 300 to identify a path container. Each path container includes an identifier (ID), which indicates the execution environment. In one embodiment, the path container ID may be available only to processes having a higher security context, or a process further up the tree of execution environment, from the path container.

Policy manager 300 includes filesystem interface 340, which represents one or more mechanisms through which policy manager 300 can access the system-level filesystem to access data and files for execution. In one embodiment, the path containers are or create part of a filesystem having specific paths related to the path containers. Filesystem interface 340 enables policy manager 300 to manage the access of each path container to its localized filesystem path. Note that each path container may have rules associated with it that can be designated, along with particular processes within the path container, by the path container ID. As far as the processes within the path container are concerned, they operate as the root user, and can read and write to system-level portions of the filesystem. However, the restrictions of the rules specific to the path containers may actually prevent such access to the processes of the path containers.

Thus, filesystem interface 340 maps or translates the requests of the processes within a path container to the corresponding path in the actual, system-level filesystem, rather than the filesystem path as seen by the processes of the path container. For example, instead of accessing files in a security context <context>, the path containers may execute as though they are accessing files in <context>, and will see <context> from within their path containers, but they may actually be accessing files in the security context <context_path_container>, with the path container ID appended to the context. <context_path_container> can be stored and managed separately on the system-level filesystem from a security context <context_path_container2>. Both path containers would see <context> from the interfacing of policy manager 300.

In one embodiment, policy manager 300 includes rule module 350. Rule module 350 may be any of a number mechanisms. In one embodiment, rule module 350 enables policy manager 300 to create policies specific to the path container, for example, by creating an instance of an applicable system-level policy, and modifying the rules based on the path container ID. The policy may be applied to the path container either by simply modifying the rules based on the path container ID, or by the saving of the specific policy in the policy manager. The policy manager may include a mapping or association table, or some other mechanism to indicate what policy is associated with what path container. In one embodiment, rule module 350 enables policy manager 300 to create a temporary rule in a system-level policy or a specific policy to restrict one or more operations within a target path container.

In one embodiment, specific policies for each path container are stored at the policy manager. Thus, policy manager 300 may include container policies 360. Whether created by administrative interaction with the host system of policy manager 300, or whether policy manager 300 creates the specific policies, they may be stored locally for management. Policies may also be stored externally to policy manager 300, which can be accessed through, for example, policy interface 310.

Figure 4:
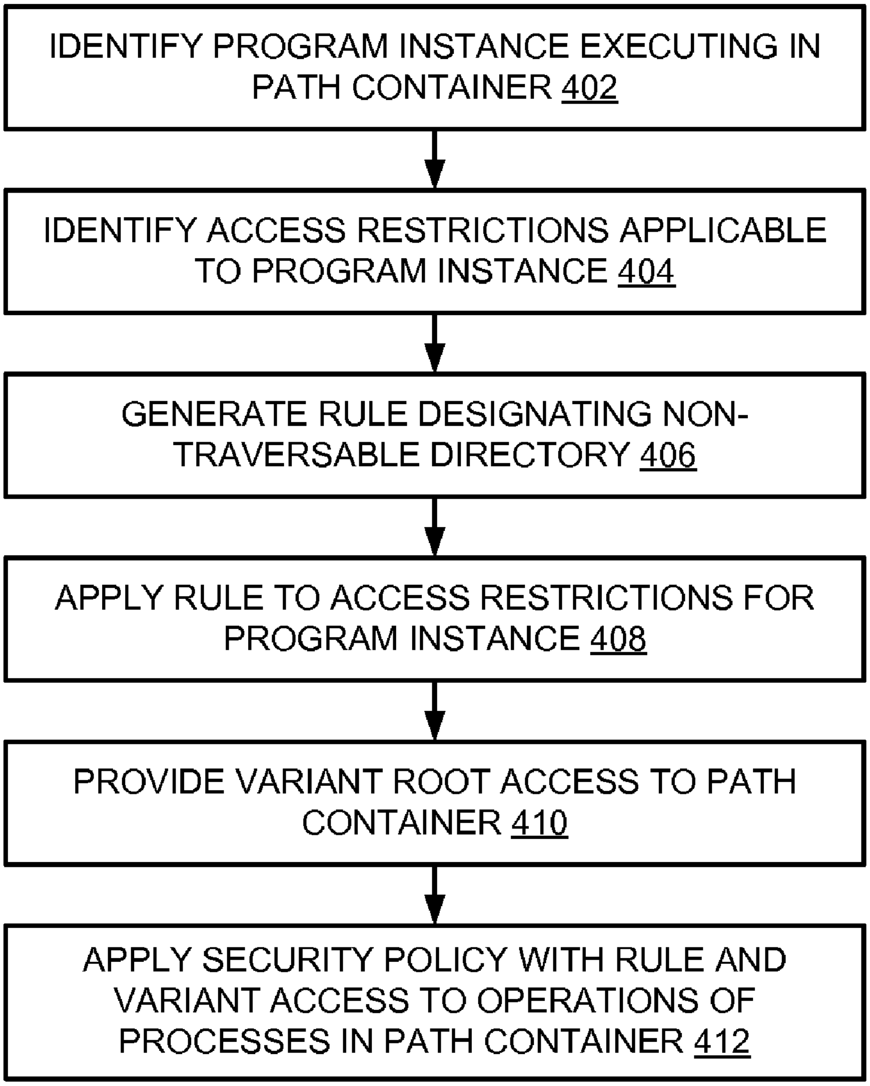
FIG. 4 is a flow diagram of an embodiment of a process for restricting processes within a path container from traversing a path back to absolute root.

FIG. 4 is a flow diagram of an embodiment of a process for restricting processes within a path container from traversing a path back to absolute root. The method or process may be performed by processing logic that may include hardware (e.g., circuitry, programmable logic, microcode, etc.), software (such as instructions run on a processing device), or a combination thereof.

A policy manager (e.g., 120, 220, 300) or an OS kernel (e.g., 110, 210) identifies a program instance (e.g., 142, 242) executing in a path container (e.g., 140, 240), 402. The policy manager or kernel identifies access restrictions applicable to the identified program instance, 404. The policy manager or kernel generates a rule (e.g., 214) designating a non-traversable directory for the program instance and the path container, 406.

The policy manager applies the rule to the access restrictions for the program instance, 408. The policy manager may also provide a variant root access (e.g., 236) to the path container, 410. The policy manager applies the security policy with the rule restricting traverse beyond the designated directory, and the variant access to operations of processes in the path container, 412.

Figure 5:
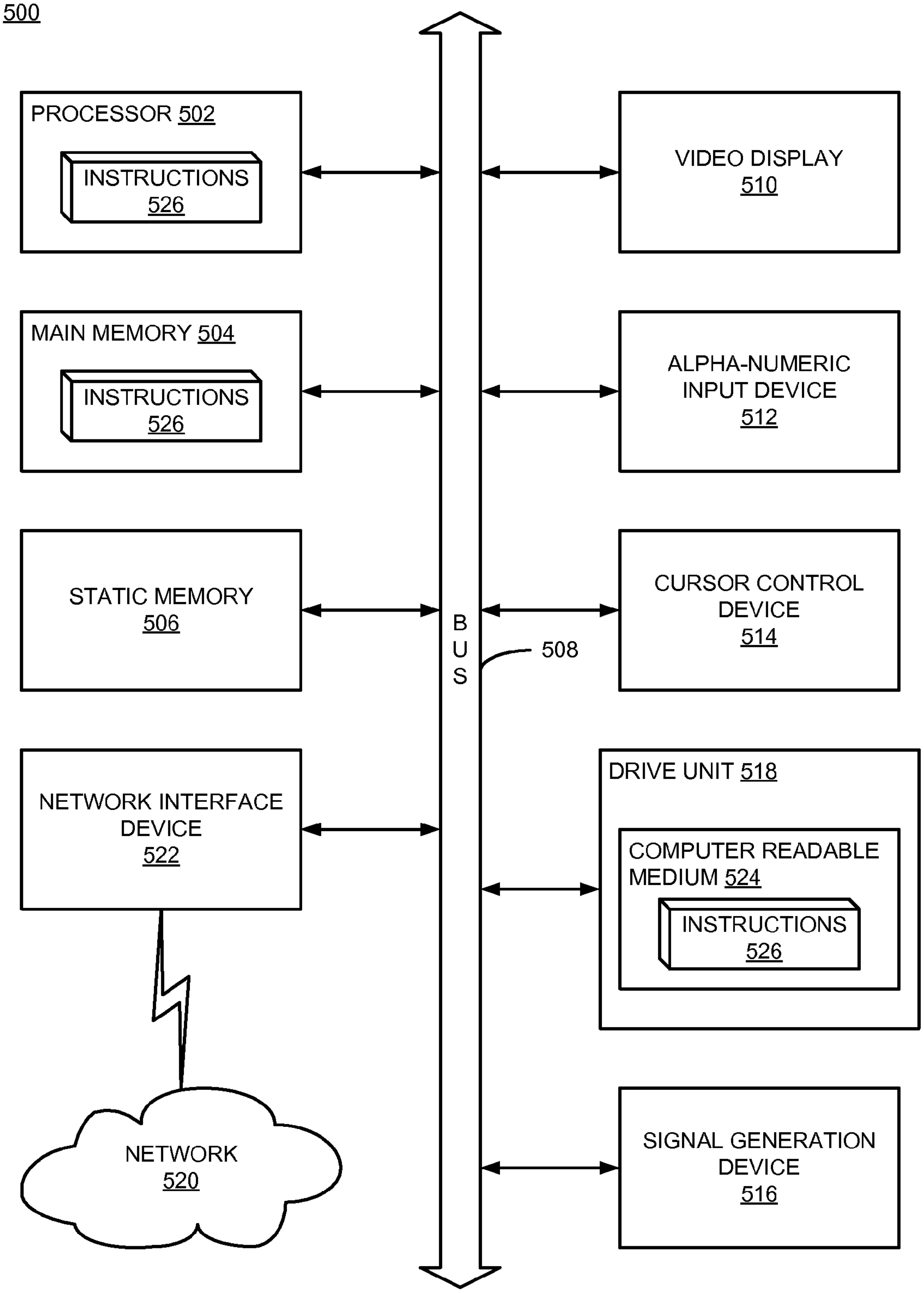
FIG. 5 is a block diagram of a computing device on which embodiments of the invention may be implemented.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 522 for performing the operations and steps discussed herein.

The computer system 500 may further include a network interface device 526. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 524 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 526.

While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, implemented by a computing system programmed to perform the following, comprising:

identifying an access restriction policy for an instance of a program executing in a path container, wherein the path container comprises a path container identifier and provides a confined execution environment for the program instance within a tree structure execution environment having a corresponding tree structure directory with an absolute root directory at a base of the tree, and wherein the access restriction policy defines rules of permitted operations for instances of one or more programs executing within the tree structure execution environment, wherein the rules comprise a non-traversal rule that prevents a process executing within the path container from traversing the tree structure directory towards the absolute root further than a specified directory;

generating an instance of the access restriction policy;

associating the instance of the access restriction policy with the path container to generate a container-specific policy associated with the path container; and applying, by the computing system, the non-traversal rule of the access restriction policy to the path container.

2. The method of claim 1, wherein identifying the access restriction policy for the program instance in the path container comprises identifying the access restriction policy for a program instance executing under a chroot.

3. The method of claim 1, wherein applying the non-traversal rule that prevents the process from traversing the tree structure further than the specified directory comprises applying the non-traversal rule as a system-wide rule generated by a service of an operating system of the computing system on which the path container exists.

4. The method of claim 3, wherein applying the system-wide rule comprises applying the non-traversal rule in conjunction with chroot function calls.

5. The method of claim 1, further comprising managing operation of the program instance within the path container based on the container-specific policy.

6. The method of claim 1, wherein applying the non-traversal rule that prevents the process from traversing the tree structure further than the specified directory comprises applying the non-traversal rule that prevents the process from traversing the tree structure further than the specified directory, wherein the specified directory is specified in terms of an absolute path of the tree structure.

7. The method of claim 1, wherein applying the non-traversal rule that prevents the process from traversing the tree structure further than the specified directory comprises applying the non-traversal rule that prevents the process from traversing the tree structure further than the specified directory, wherein the specified directory is specified in terms of a relative path of the path container.

8. A non-transitory machine-readable storage medium having content stored thereon to provide instructions to cause a machine to perform operations comprising:

identifying an access restriction policy for an instance of a program executing in a path container, wherein the path container comprises a path container identifier and provides a confined execution environment for the program instance within a tree structure execution environment having a corresponding tree structure directory with an absolute root directory at a base of the tree, and wherein the access restriction policy defines rules of permitted operations for instances of one or more programs executing within the tree structure execution environment, wherein the rules comprise a non-traversal rule that prevents a process executing within the path container from traversing the tree structure directory towards the absolute root further than a specified directory;

generating an instance of the access restriction policy;

associating the instance of the access restriction policy with the path container to generate a container-specific policy associated with the path container; and applying, by the machine, the non-traversal rule of the access restriction policy to the path container.

9. The storage medium of claim 8, wherein the content for identifying the access restriction policy for the program instance in the path container comprises content for identifying the access restriction policy for a program instance executing under a chroot.

10. The storage medium of claim 8, wherein the content for applying the non-traversal rule that prevents the process from traversing the tree structure further than the specified directory comprises content for applying the non-traversal rule as a system-wide rule generated by a service of an operating system of the machine on which the path container exists.

11. The storage medium of claim 10, wherein the content for applying the system-wide rule comprises content for applying the non-traversal rule in conjunction with chroot function calls.

12. The storage medium of claim 8, further comprising managing operation of the program instance within the path container based on the container-specific policy.

13. The storage medium of claim 8, wherein the content for applying the non-traversal rule that prevents the process from traversing the tree structure further than the specified directory comprises content for applying the non-traversal rule that prevents the process from traversing the tree structure further than the specified directory, wherein the specified directory is specified in terms of an absolute path of the tree structure.

14. The storage medium of claim 8, wherein the content for applying the non-traversal rule that prevents the process from traversing the tree structure further than the specified directory comprises content for applying the non-traversal rule that prevents the process from traversing the tree structure further than the specified directory, wherein the specified directory is specified in terms of a relative path of the path container.

15. A computer system comprising:

a storage device to store an access restriction policy for an instance of a program that executes in a path container, wherein the access restriction policy defines permitted operations for instances of the program executing within the computer system, and wherein the path container comprises a path container identifier and provides a confined execution environment for the program instance within a tree structure execution environment having a corresponding tree structure directory with an absolute root directory at a base of the tree; and a computing device operatively coupled to the storage device, the computing device comprising a policy manager to identify the access restriction policy as corresponding to the program instance, the access restriction policy comprising rules of permitted operations of instances of one or more programs executing within the tree structure execution environment, and the rules comprising a non-traversal rule that prevents a process executing within the path container from traversing the tree structure directory towards the absolute root further than a specified directory, the policy manager to apply the non-traversal rule as a local rule generated by generating an instance of the access restriction policy and to associate the instance of the access restriction policy with the path container to generate a container-specific policy associated with the path container, and the policy manager to apply the non-traversal rule of the access restriction policy to the path container.

16. The computer system of claim 15, the policy manager to identify the access restriction policy for a program instance executing under a chroot.

17. The computer system of claim 15, the policy manager to apply the non-traversal rule as a system-wide rule generated by a service of an operating system of the computer system on which the path container exists.

18. The computer system of claim 17, the policy manager to apply the non-traversal rule in conjunction with chroot function calls.

19. The computer system of claim 15, the policy manager to manage operation of the program instance within the path container based on the container-specific policy.

20. The computer system of claim 15, the policy manager to apply the non-traversal rule that prevents the process from traversing the tree structure further than the specified directory, wherein the specified directory is specified in terms of an absolute path of the tree structure.

21. The computer system of claim 15, the policy manager to apply the non-traversal rule that prevents the process from traversing the tree structure further than the specified directory, wherein the specified directory is specified in terms of a relative path of the path container.

* * * * *